(12) United States Patent
Wu et al.

(10) Patent No.: US 7,310,739 B2
(45) Date of Patent: Dec. 18, 2007

(54) UNIVERSAL SERIAL BUS AND METHOD FOR TRANSMITTING SERIAL CLOCK AND SERIAL DATA SIGNALS DURING POWER-SAVING MODE

(75) Inventors: Arthur Wu, Taoyuan (TW); Wen-Hwa Chou, Taipei (TW)

(73) Assignee: Prolific Technology Inc., Taipei (TW)

( * ) Notice: Subject to any disclaimer, the term of this patent is extended or adjusted under 35 U.S.C. 154(b) by 252 days.

(21) Appl. No.: 10/904,181

(22) Filed: Oct. 28, 2004

(65) Prior Publication Data

US 2005/0091549 A1    Apr. 28, 2005

(30) Foreign Application Priority Data

Oct. 28, 2003    (TW) .............................. 92129880 A

(51) Int. Cl.
  *G06F 9/00*    (2006.01)
(52) U.S. Cl. ........................... 713/320; 710/11; 710/14
(58) Field of Classification Search ................ 713/320; 710/11, 14
See application file for complete search history.

(56) References Cited

U.S. PATENT DOCUMENTS

| 6,272,644 B1 * | 8/2001 | Urade et al. ................ 713/320 |
| 6,774,604 B2 * | 8/2004 | Matsuda et al. ............ 320/110 |
| 2003/0212841 A1 * | 11/2003 | Lin ............................ 710/62 |
| 2004/0078498 A1 * | 4/2004 | Saotome ........................ 710/8 |

* cited by examiner

*Primary Examiner*—Chun Cao
*Assistant Examiner*—Albert Wang
(74) *Attorney, Agent, or Firm*—Jianq Chyun IP Office

(57) ABSTRACT

A universal serial bus (USB) with a power-saving mode and an operating method thereof are provided. When the USB peripheral is coupled to the USB host, the USB host core logic of the USB host transmits an inquiry request via a USB transceiver to inquire whether or not the USB peripheral supports the power-saving mode. The core logic of the USB peripheral responds via the USB transceiver that the power-saving mode is supported. Then the USB peripheral is off-line and then is shifted to be on-line for operating the power-saving mode. The USB host is also switched to the power-saving mode. Under the power-saving mode, the data are respectively transceived by the serial transceivers. The clock frequency of the serial transceiver can be adjusted according to the request of data transmission.

8 Claims, 3 Drawing Sheets

UNIVERSAL SERIAL BUS AND METHOD FOR TRANSMITTING SERIAL CLOCK AND SERIAL DATA SIGNALS DURING POWER-SAVING MODE

CROSS-REFERENCE TO RELATED APPLICATION

This application claims the priority benefit of Taiwan application serial no. 92129880, filed Oct. 28, 2003.

BACKGROUND OF THE INVENTION

1. Field of the Invention

The present invention relates to a universal serial bus (USB), and more particularly, to a USB with a power-saving mode and an operating method thereof.

2. Description of the Related Art

Universal serial bus (USB) technology has been widely used to various peripheral devices. With the development of electronics technology, the USB standard has been upgraded from USB1.1 to USB2.0. The data transmission speed has also increased from 12 Mbps to 480 Mbps.

The high-speed USB2.0 has surpassed the transmission speed of the USB1.1 by 40 times, and the USB2.0 has more application on various products. Usually, low-speed transmission devices, such as keyboards or mouse, use USB1.1 for data transmission. Since the speed of the USB2.0 has been greatly improved, it can be like the Fire Wire/IEEE 1394, and have wide applications on those devices needing large broad band, such as digital cameras, video cameras, storage apparatus, scanners and so on. In addition, the USB2.0 has other advantages that Fire Wire/IEEE 1394 does not have. For example, the USB has the feature of plug-and-play, which is suitable for personal digital assistants (PDAs), digital cameras, MP3 players or other portable devices. However, these portable devices are usually powered by batteries. How to reduce power consumption when operating the USB is a task to be dealt with for portable devices.

FIGS. 1-3 are schematic drawings showing conventional USB devices. Referring to FIG. 1, the USB2.0 host 110 is directly coupled to the USB2.0 peripheral 120 via connecting terminals. Since the USB2.0 host 110 and the USB2.0 peripheral 120 support high-speed data transmission, the data transmission speed can be 480 Mbps.

Referring to FIG. 2, the USB2.0 host 210 is coupled to the USB2.0 peripheral 220 via the hub 215. Since the USB2.0 host 210, the hub 215 and the USB2.0 peripheral 220 support high-speed data transmission, the data transmission speed can be 480 Mbps.

With reference to FIG. 3, the USB2.0 host 310 is directly coupled to the USB2.0 peripheral 320 via connecting terminals. Since the USB2.0 host 310 does not support high-speed transmission, the data transmission speed can only be 12 Mbps. It is called full-speed transmission or 1.5 Mbps low-speed transmission.

For desk-top computers, the application of USB2.0 for data transmission does not affect the operations even if the high-speed data transmission consumes a huge amount of power. For PDAs, digital cameras, MP3 players or the other portable devices which are powered by batteries, however, the high-speed data transmission can easily exhaust the batteries and reduce the operation time.

SUMMARY OF THE INVENTION

Accordingly, the present invention is directed to a universal serial bus with a power-saving mode and an operating method thereof. In addition to high-speed data transmission under the normal operational mode, the universal serial bus in the present invention provides the power-saving mode to extend the operation time of the battery in portable devices.

In order to achieve the object described above, the present invention discloses a universal serial bus with a power-saving mode. The universal serial bus with a power-saving mode comprises a universal serial bus driving transceiver, a serial transceiving port and a universal serial bus core logic. Wherein, the universal serial bus driving transceiver comprises a first differential data signal terminal and a second differential data signal. The serial transceiving port comprises a serial clock signal terminal and a serial data signal terminal, which are coupled to the first differential data signal terminal and the second differential data signal terminal, respectively. The universal serial bus core logic is coupled to the universal serial bus driving transceiver and the serial transceiving port. Under a normal operational mode, the first and the second differential data signal terminals are triggered for transceiving differential data signals. Under a power-saving mode, the serial clock signal terminal and the serial data signal terminal are triggered for transceiving a serial clock signal and a serial data signal.

In an embodiment of the present invention, when the universal serial bus with the power-saving mode is a universal serial bus host, the universal serial bus core logic is a universal serial bus host core logic. When a connection to the universal serial bus peripheral is detected, the universal serial bus host core logic transmits an inquiry command for identifying whether the universal serial bus peripheral supports the power-saving mode. If the universal serial bus peripheral supports the power-saving mode, the power-saving mode is activated. Under the power-saving mode, the universal serial bus host core logic adjusts a frequency of the serial clock signal according to a request of data transmission. If there is no request of data transmission, the universal serial bus host core logic stops transmitting the serial clock signal in order to save power.

In an embodiment of the present invention, when the universal serial bus controller with the power-saving mode is a universal serial bus peripheral, the universal serial bus core logic is a universal serial bus peripheral core logic. When receiving an inquiry command from a universal serial bus host, the universal serial bus peripheral core logic responds that the power-saving mode is supported. The universal serial bus peripheral core logic is off-line and then reconnected again for operating the power-saving mode.

The present invention also discloses an operating method for a universal serial bus, adapted to combine a universal serial bus peripheral with a power-saving mode and a universal serial bus host with a power-saving mode to operate in a power-saving mode. The method starts by transmitting an inquiry command from the universal serial bus host for inquiring whether or not the universal serial bus peripheral supports the power-saving mode. The universal serial bus peripheral responds that the universal serial bus peripheral can support the power-saving mode. The universal serial bus peripheral is in off-line and then reconnected again for operating the power-saving mode. Accordingly, the universal serial bus host is switched to the power-saving mode.

Under the power-saving mode, the universal serial bus host and the universal serial bus peripheral communicate by a serial clock signal and a serial data signal. The serial clock signal is provided by the universal serial bus host.

The universal serial bus host adjusts a frequency of the serial clock signal according to a request of data transmission. If there is no request of data transmission from the judgment, the universal serial bus host stops transmitting the serial clock signal in order to further save power.

Accordingly, by using the universal serial bus controller of the invention with a power-saving mode and the operating method thereof, the universal serial bus controller can be operated under the normal operational mode and provide high-performance data transmission and can further be operated under power-saving mode to save the power consumption of the portable devices and extend the operation time of the portable devices.

The above and other features of the present invention will be better understood from the following detailed description of the embodiments of the invention that is provided in combination with the accompanying drawings.

DESCRIPTION OF THE EMBODIMENTS

Figure 4:
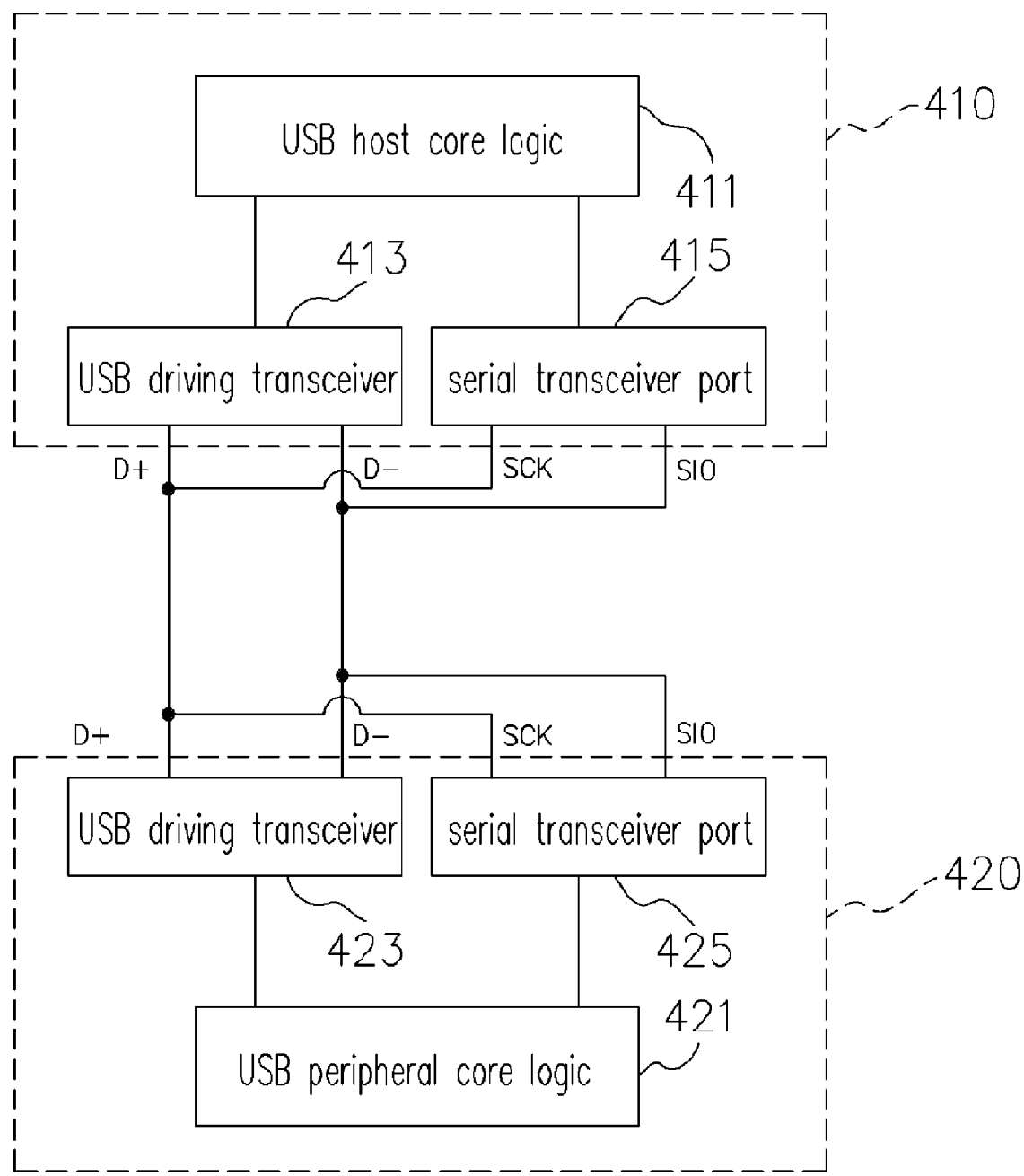
FIG. 4 is a schematic drawing showing a universal serial bus (USB) with a power saving mode according to an embodiment of the present invention.

FIG. 4 is a schematic drawing showing a universal serial bus (USB) with a power saving mode according to an embodiment of the present invention. With reference to FIG. 4, the USB can combine the USB peripheral 420 having a power-saving mode and the USB host 410 having a power-saving mode and operate under the power-saving mode. When the USB of the present invention is used in personal digital assistants (PDAs), digital cameras, MP3 players or the other portable devices, the batteries therein can have longer operation time. Under the normal operational mode, the USB of the present invention maintains the high-speed data transmission. The operation mechanism is described as follows.

As shown in FIG. 4, the USB host 410, which has the power-saving mode, comprises the USB driving transceiver 413, the serial transceiving port 415 and the USB host core logic 411. The USB driving transceiver 413 comprises the first differential data signal terminal D+ and the second differential data signal terminal D− for transceiving the differential data signals under the USB protocol. The serial transceiving port 415 comprises the serial clock signal terminal SCK and the serial data signal terminal SIO. The serial clock signal terminal SCK and the serial data signal terminal SIO are coupled to the first differential data signal terminal D+ and the second differential data signal terminal D−, respectively, for transceiving, for example, the serial clock signals and the serial data signals under the serial protocol. Though the serial clock signal terminal SCK and the serial data signal terminal SIO are coupled to the first differential data signal terminal D+ and the second differential data signal terminal D−, respectively, one of ordinary skill in the art may change the coupling of these terminals. The USB host core logic 411 is coupled to the USB driving transceiver 413 and the serial transceiving port 415. Under the normal operation, the first differential data signal terminal D+ and the second differential data signal terminal D− are triggered for transceiving the differential data signals. Under the power-saving mode, the serial clock signal terminal SCK and the serial data signal terminal SIO are triggered for transceiving the serial clock signal and the serial data signal.

The USB peripheral 420, which has the power-saving mode, comprises the USB driving transceiver 423, the serial transceiving port 425 and the USB peripheral core logic 421. The USB driving transceiver 423 comprises the first differential data signal terminal D+ and the second differential data signal terminal D− for transceiving the differential data signals of the USB protocol to the USB host 410. The USB transceiving port 425 comprises the serial clock signal terminal SCK and the serial data signal terminal SIO. The coupling of the serial clock signal terminal SCK and the serial data signal terminal SIO depends on the coupling structure in the USB host 410. In this embodiment, the serial clock signal terminal SCK and the serial data signal terminal SIO are coupled to the first differential data signal terminal D+ and the second differential data signal terminal D−, respectively, for transceiving the serial clock signals and the serial data signals of the serial protocol, for example. The USB peripheral core logic 421 is coupled to the USB driving transceiver 423 and the serial transceiving port 425. Under the normal operation, the first differential data signal terminal D+ and the second differential data signal terminal D− are triggered for transceiving the differential data signals. Under the power-saving mode, the serial clock signal terminal SCK and the serial data signal terminal SIO are triggered for transceiving the serial clock signal and the serial data signal.

When the USB peripheral 420 having a power-saving mode is coupled to the USB host 410 having a power-saving mode, the USB host core logic 411 transmits an inquiry command via the USB driving transceiver 413 to inquire whether or not the USB peripheral supports the power-saving mode. After the USB peripheral core logic 421 receives the inquiry command from the USB host 410 with the power-saving mode via the USB driving transceiver 423, the USB peripheral core logic 421 responds that the USB peripheral 420 supports the power-saving mode via the USB driving transceiver 423. The USB peripheral 420 is then off-line and then on-line again for operating the power-saving mode. Under the power-saving mode, the data transceiving is executed by the serial transceiving port 425 and the un-used circuits are turned off to save power.

Likewise, when the USB host 410 with the power-saving mode receives the response or detects that the USB peripheral 420 is off-line, the data transmission is executed by the serial transceiving port 415 and the un-used circuits are turned off to save power. Under the power-saving mode, the serial clock signal terminal SCK of the serial transceiving port 415 transmits the serial clock signal and the serial data signal terminal SIO of the serial transceiving port 415 transmits the data signal with reference to the serial clock signal. The USB host core logic 411 adjusts the frequency of the serial clock signal according to the request of the data transmission. If there is no request of data transmission, the USB host core logic 411 stops transmitting the serial clock signal to save power.

When USB host 410 with a power-saving mode is coupled to a conventional USB peripheral (not shown), the inquiry command of whether the USB supports the power-saving mode is not responded, and a stall signal is received. Accordingly, the operation of the USB host 410 maintains under the normal operational mode and its original functions are not affected.

Figure 1:
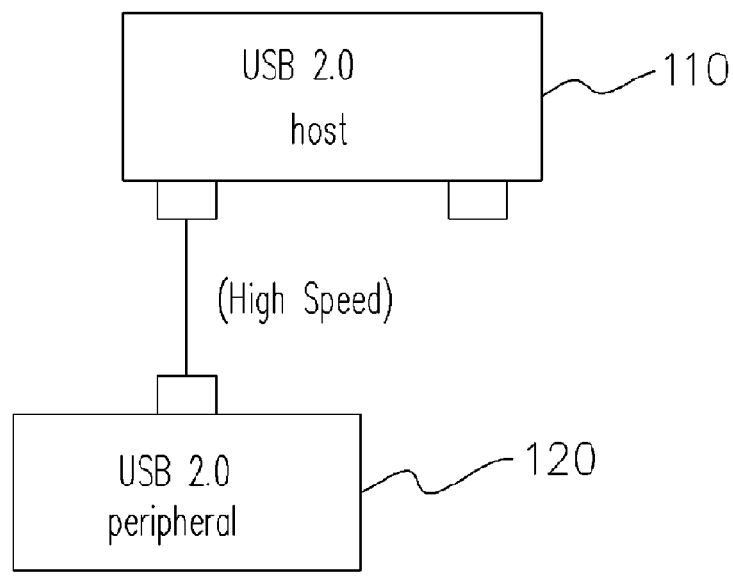
FIGS. 1-3 are schematic drawings showing conventional USB devices.
Figure 2:
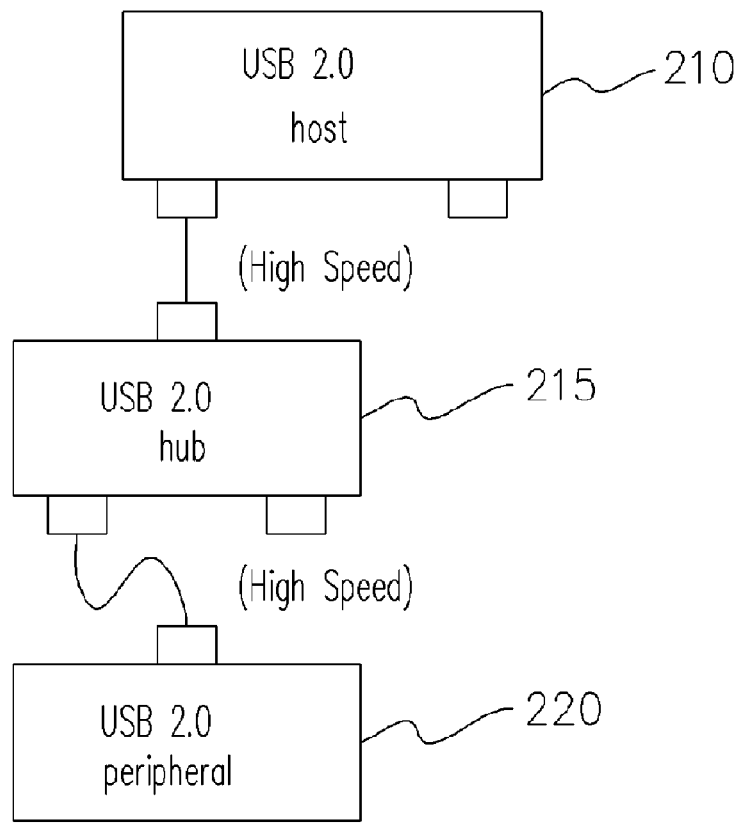
Figure 3:
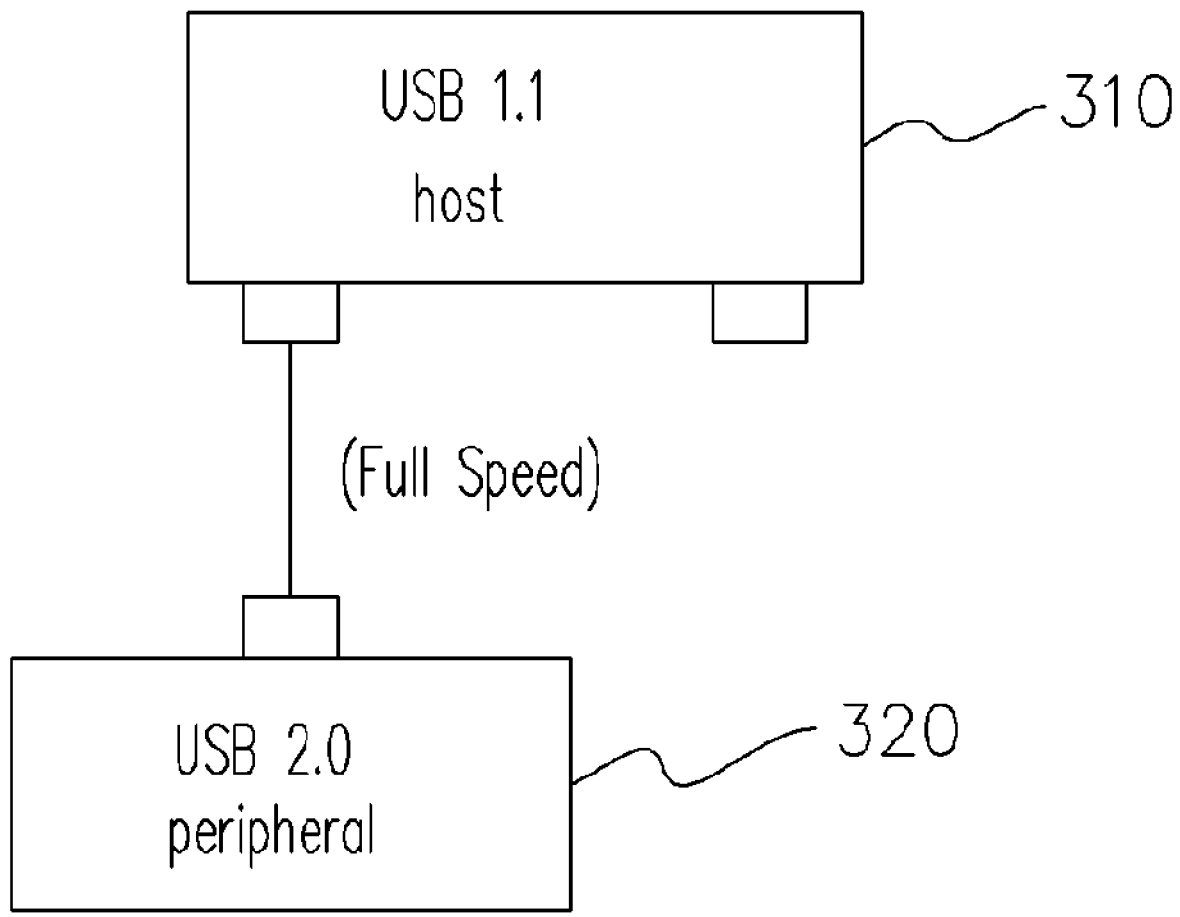

When the USB peripheral 420 having a power-saving mode is coupled to the USB1.1 host 310 as shown in FIG. 3, the USB peripheral core logic 421 transmits data in full speed. The USB peripheral core logic 421 turns off the circuits related to high-speed data transmission and slows the frequency of the operating clock to save power. Under this situation, the serial transceiving port 425 is not required.

Accordingly, an operating method for a universal serial bus is provided. The operating method is adapted to operate a universal serial bus peripheral with a power-saving mode and a universal serial bus host in the power-saving mode. The method first transmits an inquiry command from the universal serial bus host for inquiring whether or not the universal serial bus peripheral supports the power-saving mode. Then, the universal serial bus peripheral responds that the power-saving mode is supported. Next, the universal serial bus peripheral is off-line and then reconnected for operating the power-saving mode. Accordingly, the universal serial bus host is switched to the power-saving mode.

Under the power-saving mode, the universal serial bus host and the universal serial bus peripheral communicate by a serial clock signal and a serial data signal. The serial clock signal is provided by the universal serial bus host.

The universal serial bus host core logic adjusts a frequency of the serial clock signal according to a request of data transmission. If it is judged that there is no request of data transmission, the universal serial bus host stops transmitting the serial clock signal in order to further save power.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A universal serial bus with a power-saving mode, comprising:
    a universal serial bus driving transceiver, comprising a first differential data signal terminal and a second differential data signal terminal;
    a serial transceiving port, comprising a serial clock signal terminal and a serial data signal terminal, which are coupled to the first differential data signal terminal and the second differential data signal terminal, respectively; and
    a universal serial bus core logic, coupled to the universal serial bus driving transceiver and the serial transceiving port, wherein when under a normal operational mode, the first and the second differential data signal terminals are driven for transceiving differential data signals; when under a power-saving mode, the serial clock signal terminal and the serial data signal terminal are driven for transceiving a serial clock signal and a serial data signal.

2. The universal serial bus with the power-saving mode of claim 1, wherein the universal serial bus core logic is a universal serial bus host core logic.

3. The universal serial bus with the power-saving mode of claim 2, wherein when the universal serial bus host core logic has detected a connection of a universal serial bus peripheral, the universal serial bus host core logic transmits an inquiry command for inquiring whether or not the universal serial bus peripheral supports the power-saving mode, and if the universal serial bus peripheral supports the power-saving mode, the power-saving mode is activated.

4. The universal serial bus with the power-saving mode of claim 2, wherein when under the power-saving mode, the universal serial bus host core logic adjusts a frequency of the serial clock signal according to a request of data transmission.

5. The universal serial bus with the power-saving mode of claim 2, wherein if there is no request of data transmission, the universal serial bus host core logic stops transmitting the serial clock signal.

6. The universal serial bus with the power-saving mode of claim 1, wherein the universal serial bus core logic is a universal serial bus peripheral core logic.

7. The universal serial bus with the power-saving mode of claim 6, wherein when receiving an inquiry command from a universal serial bus host, the universal serial bus peripheral core logic responds that the universal serial bus peripheral supports the power-saving mode, and is off-line and then reconnected again for operating the power-saving mode.

8. An operating method for a universal serial bus, adapted to combine a universal serial bus peripheral with a power-saving mode and a universal serial bus host with a power-saving mode to operate in a power-saving mode, the method comprising:
    transmitting an inquiry command from the universal serial bus host for inquiring whether or not the universal serial bus peripheral supports the power-saving mode;
    responding the inquiry command by the universal serial bus peripheral that the power-saving mode is supported, the universal serial bus peripheral being off-line and then reconnected for operating the power-saving mode; and
    switching the universal serial bus host to the power-saving mode;
    wherein under the power-saving mode, the universal serial bus host and the universal serial bus peripheral communicate by a serial clock signal and a serial data signal, wherein the serial clock signal is provided by the universal serial bus host, and the universal serial bus host core logic adjusts a frequency of a serial clock signal according to a request of data transmission and the universal serial bus host core logic stops transmitting the serial clock signal if it is indeed that there is no request of data transmission.

* * * * *